United States Patent [19]

Schiffmann et al.

[11] 4,318,931

[45] Mar. 9, 1982

[54] METHOD OF BAKING FIRM BREAD

[75] Inventors: Robert F. Schiffmann, Manhattan; Alfred H. Mirman, Nanuet; Richard J. Grillo, Hawthorne, all of N.Y.

[73] Assignee: International Telephone and Telegraph Corporation, New York, N.Y.

[21] Appl. No.: 50,398

[22] Filed: Jun. 20, 1979

Related U.S. Application Data

[63] Continuation of Ser. No. 700,990, Jun. 29, 1976, abandoned.

[51] Int. Cl.³ .............................................. A21D 8/06
[52] U.S. Cl. ..................................... 426/243; 426/19; 426/505; 426/523
[58] Field of Search .................................. 426/19–27, 426/241–243, 245, 549, 557, 559, 512, 523; 219/10.55 R, 10.55 E; 99/DIG. 14

[56] References Cited

U.S. PATENT DOCUMENTS

| | | | |
|---|---|---|---|
| 2,054,756 | 9/1936 | Kremer | 426/244 |
| 3,332,370 | 7/1967 | Brastad | 426/243 |
| 3,556,817 | 1/1971 | Jeppson | 426/241 |
| 3,854,023 | 12/1974 | Levinson | 219/10.55 |

*Primary Examiner*—Raymond N. Jones
*Assistant Examiner*—Elizabeth A. Hatcher
*Attorney, Agent, or Firm*—John T. O'Halloran; David M. Quinlan

[57] ABSTRACT

A method of baking firm bread in metal pans using microwave energy is described. The baking process of this invention involves a two-stage baking process utilizing conventional heating as a first stage in covered baking pans normally utilized for baking firm bread, and a second stage involving the simultaneous use of conventional heating and microwave energy.

8 Claims, No Drawings

METHOD OF BAKING FIRM BREAD

CROSS-REFERENCE TO RELATED APPLICATIONS

This is a Continuation Application of application Ser. No. 700,990, filed June 29, 1976, (now abandoned).

The method of this invention involves some of the teachings of applications Ser. Nos. 700,942 and 700,943, both filed on June 29, 1976 and assigned to the assignee of this invention. To the extent desirable in order to completely understand the subject matter of this invention, the disclosure of said applications are incorporated herein by reference. The method of this invention involves some of the teachings of application Ser. No. 050,396, filed June 20, 1979, which is a continuation of application 700,942, filed June 29, 1976 (now abandoned), and of application Ser. No. 050,397 filed June 20, 1979 (now abandoned in favor of continuation-in-part application Ser. No. 233,755, filed Feb. 12, 1981), which was a continuation of application Ser. No. 700,943, filed June 29, 1976 (now abandoned), all of which have been assigned to the assignee of the present invention. To the extent desirable in order to completely understand the subject matter of this invention, the disclosures of applications Ser. No. 050,396 and Ser. No. 050,397 are incorporated herein by reference.

BACKGROUND OF THE INVENTION

The baking of bread, as in many other cases involving convective/conductive heat transfer, is very wasteful of heat energy. In order to bake the bread, it is necessary to first heat the walls of the oven and the air within the oven so that this heat energy may be transferred to the surface of the bread and then slowly carried to the interior via conductive heat transfer. The process is largely limited by the rate at which heat can be conducted from the surface of the bread to the interior. While the process can be speeded up somewhat in a conventional oven through the use of higher ambient temperatures, this is rapidly limited by the temperature at which the surface begins to brown excessively and bakeout becomes too high, as the major negative effects. The result of this is that white bread is conventionally baked for 17 to 23 minutes at 400° F. to 415° F.

Early experiments in baking bread involved the serial application of microwaves and conventional heat, i.e., first applying microwaves to obtain the oven spring and setting the structure and then finish baking with conventional heat to obtain the much needed crust color. While some degree of success was seen, particularly the 915 MHz frequency, the finished loaves left much to be desired since they tended to collapse, had poor rubbery interior structures and very rough unusual crust characteristics. The initial work was done using "Pyrex" and "Corning Ware" type baking dishes, however, here was excessive collapse due to poor sidewall formation. A significant improvement was made using paparboard containers, however, according to the invention a quantum jump in improvement of product quality began with the use of metal baking pans. This is contrary to all accepted practice in microwave processing. Two publications: K. Lorenz et al, "Baking with Microwave Energy", *Food Technology, December*, 1973: and T. H. Collins, "Exploring the Baking of Bread with Microwaves", *FMBRA Bulletin* (3), P. 175, 1970; both describe the use of metal baking pans for bread baking in a microwave field as an impossibility since the microwaves will only penetrate the dough through the top and not bake evenly.

A very popular type of bread sold commercially as prepackaged, sliced bread is generically referred to as "firm bread". This is characterized as having more of a home-made appearance, with a square cross-section rather than a round top, a coarser more open grain than the usual foam-like white bread, and a firm texture and eating quality. It may be further characterized as being denser and of lowermoisture content than the more typical white:

Firm Bread: Density: 0.25 grams/c.c.; Moisture: 34.9%

Typical White Bread: Density: 0.18 grams/c.c.; Moisture: 38.2%

A further measure of difference is its "firmness" as measured analytically by an Instron Universal Tester. Typical "Instron firmness" values are:

Firm Bread: 48 units

Typical White Bread: 12 units

The manufacture of firm bread also differs from typical white bread. In order to achieve the square cross-section, the bread is baked in a covered pan rather than an open baking pan. Further, its baking time is typically 40 minutes or longer whereas typical white bread is baked in 17 to 23 minutes. It is this latter difference which is of significance to the commercial bakery since it means the ovens must run at only half their regular speed and thus production output per hour is halved. A valuable processing contribution to the baking industry would be to speed up this baking process.

Upon investigation it was found that all of the "oven-spring" (that is the expansion to full volume) occurs within the first 10–12 minutes of baking. Further, very little bake-out loss (that is moisture loss) occurs in this early time period. This being so, we investigated the method of using microwave energy to finish bake the bread after the initial baking period to achieve the volume expansion. The baking was done with the dough in metal baking pans throughout the entire baking cycle, but with the lid on during the first 10–12 minutes of conventional baking and then removing the lid and finish baking with microwaves and hot air for the last 10–12 minutes to give total baking time of 22 minutes; about a 50% savings in time.

SUMMARY OF THE INVENTION

It is an object of the invention to shorten baking time of firm bread by combining microwave baking with conventional baking.

It is another object of the invention to perform the baking of firm bread in metal baking pans for the entire baking cycle including the time the baking is being done in a microwave field.

It is a further object of the invention to shorten baking time of firm bread with microwaves and thereby increase productivity, and reduce energy costs by increasing the oven capacity associated with this product.

The novel process for baking firm bread of this invention involves a two-stage baking process. The first stage is conventional in that standard lidded baking pans are employed using conventional oven heat in a conventional oven, but for a substantially reduced period of time. Oven spring and set are accomplished with the dough being confined at the top by the lid on the pans. Suitable means are employed at this point in the baking process to remove the lids, whereupon the bread is finished in the second stage which involves the simultaneous baking of the bread with conventional heat and microwave energy.

It is the principal object of this invention to reduce substantially the baking time associated with firm bread production by employing a two-stage baking process, the first stage of which is shorter than normal and utilizes lidded pans, and the second stage of which involves simultaneous use of conventional oven heat with microwave energy after the lids have been removed from the pans.

According to the invention, the baking of firm bread by first baking it in a covered metal baking pan utilizing the convective heat transfer of the oven, and then removing the metal cover and exposing the uncovered, partially baked bread to a combination of microwave energy and hot air has been done successfully by this technique. The first stage of baking with the cover on can typically be done in 10-12 minutes while the second stage with the cover removed can be completed in 10 to 12 minutes. This amounts to a reduction of about 50% in the baking time and increases production capacity by about 100%. The removal of the cover from the metal pan is necessary in order to allow the penetration of the microwave energy into the dough since microwave energy is not able to penetrate metal and would otherwise be totally restricted from entering the bread. The firm bread produced in accordance with the invention was internally panel tested against typical standard commercial firm bread with favorable comparable results.

DESCRIPTION OF THE PREFERRED EMBODIMENTS

The present invention will be more readily understood from a consideration of the following examples, given for the purpose of illustration, which are not to be considered as limiting the scope of this invention.

EXAMPLE I

Significant reduction in bake time associated with firm bread production was also obtained by employing microwave energy and metal pans. Normal bake time for firm bread of 40 minutes was reduced utilizing a two-stage bake process. The bake process involved conventional heating and conventional heating with microwave energy applied simultaneously. Microwave firm bread produced under this bake procedure was tested against a typical commercial firm bread and the results compared favorably. Staling rate studies for the microwave firm bread and typical commercial firm bread resulted in no difference in staling rate.

PROCEDURE

The process was performed utilizing the straight dough system since it is presently utilized in the production of most firm breads. A typical formulation for the firm bread is:

| Ingredients | % Formula |
|---|---|
| Unbleached Flour | 53.782 |
| Shortening | 4.034 |
| Granulated Sugar | 2.689 |
| Reconstituted Milk | 1.613 |
| Salt | 1.210 |
| Yeast | 1.076 |
| Butter | 1.076 |
| Honey | 1.076 |

| Ingredients | % Formula |
|---|---|
| Whole Egg Solids | 0.269 |
| Calcium Sulfate | 0.235 |
| MLO | 0.134 |
| Calcium Propionate | 0.067 |
| Water* | 32.739 |
| | 100.000 |

*Total water is added as 3.638/1 water/ice mixture.

The ingredients are mixed for approximately 5 minutes at about 106 RPM and allowed to ferment for approximately 1.5 hours at about 85° F. to 95° F. Mold in Stickelber Cross Grain Molder and place individual one pound loaves into metal pans, typically 4"×4"×8". Proof approximately 50 minutes at about 104° F. to 110° F., wet bulb and dry bulb respectively.

Before employing microwaves as a means for reducing the long bake time associated with producing firm bread, the conventional long bake process was performed and measurements for a number of bread loaf attributes during various stages of baking were taken. The degree of bakeout at 5 minute intervals, the amount of crust development and monitoring of oven spring were measured during the standard complete bake cycle of about 40 minutes at 380° F. Results of bakeout measurements showed that during the initial stages of baking small moisture losses were taking place as compared to the latter stages of baking. In addition, complete oven spring (to the pan cover) occurred during the first 10-12 minutes of baking. Both these factors meant that microwaves should not be used during the initial stages of baking, since microwave energy tends to increase the rate of water removal or bakeout rate. Therefore, a better matching of product to process could be obtained by incorporating microwave energy during the latterstages. The desired amount of oven spring with concomittant crumb structure setting took place during the first 10-12 minutes of baking, and introduction of microwave energy tended to upset the delicate dynamic bake process occurring during this stage. Additionally, the pan cover would have to be removed and further would upset convective and radiant heat transfer processes. Monitoring of crust development was also performed. Crust thickness measurements obtained from the conventional firm bread bake process resulted in a uniform crust thickness of about ⅛" all around the bread loaf.

MICROWAVE FIRM BREAD BAKE PROCESS

Using the "Microaire" oven set at 380° F. for conventional heat only, a series of runs were performed in which the pan cover was removed at various times between 10-15 minutes of baking. After pan cover removal, microwave energy was introduced at a power level of about 50 watts output power per loaf utilizing the 2450 MHz input (a microwave flux density of 5.8 to 10.8 watt hours per pound while simultaneously employing convectional heat at 380° F. The bread was removed at various times during the latter stage of baking for weight measurement as a means for monitoring bakeout loss. Bakeout loss of approximately 8% was utilized for fixing the bake time end point. Firm bread obtained from each of these runs had the coarse grain and crumb structure equivalent to conventional firm bread, but the crust except for the top was not quite as thick.

| Time With Lid On Min. | Total Bake Time Min. | Time Into Baking Min. | % Bakeout Loss | Crust Thickness In. | |
|---|---|---|---|---|---|
| 10 | 23 | 10 | 1.16 | Top | ⅛ |
| | | 15 | 3.29 | Sides | 3/32 |
| | | 20 | 5.80 | Bottom | 1/16 |
| | | 23 | 8.12 | | |
| 12 | 22 | 12 | 1.93 | Top | ⅛ |
| | | 15.25 | 3.68 | Sides | 1/16 |
| | | 20 | 6.96 | Bottom | 1/32 |
| | | 22 | 7.93 | | |
| 15 | 23 | 15 | 2.71 | Top | 3/32 |
| | | 20.5 | 3.92 | Sides | 1/16 |
| | | 23 | 7.93 | Bottom | 1/32 |

Attempts to reduce total bake time further by increasing the conventional bake temperature were not successful. Temperatures from 380° F. to 415° F. all resulted in equivalent bake times with microwaves employed after removal of the lid cover. Since bake time end point was determined by monitoring bakeout losses, the only real difference observed was an increase in crust thickness with increasing conventional bake temperatures.

RESULTS

The experimental samples of microwave firm bread were placed in a paired comparison taste panel to test against a standard type oven baked, white firm bread. Each loaf was rated for several attributes, namely, firmness, flavor, tenderness, moistness, etc., and preference. Statistical analysis resulted in no significant differences for any of the attributes and overall preference. Also, Instron measurements were obtained over several days for microwave firm bread and the standard firm bread. Tests indicate that the rate of staling for both bread types are about the same.

At a lower power level of about 50 watts per pound loaf of microwave energy over a 10 minute period beyond the first 12 minutes of baking enabled the reduction of the conventional bake time from about 40 minutes to about 22 minutes. At this energy input the net coupled microwave power is equivalent to only 30 BTU. This small microwave power input enabled a significant reduction in bake time. A 45% reduction in total bake time was obtained by imposing the low microwave power input after pan cover removal. If it is assumed that the mass average temperature of the bread loaf is 130° F. prior to pan cover removal, calculation reveals that only approximately 33 BTU are required to effect gelatinization by raising the internal dough temperature to 180° F. The major effect of microwaves is that they provide a means for homogeneously introducing energy in the form of heat as opposed to conventional means whereby the heat transfer rate is specifically controlled by a number of resistances. The addition of this small amount of microwave energy can account for a sizable portion of the total bakeout loss. Calculation reveals that 30 BTU of energy when coupled to the bread loaf will drive off more than 33% of the evaporative load.

Tests have indicated that various standard pan configurations of four to five metal pans strapped together and equipped with a unitary removable cover are as effective as the individual pans described in the examples.

EXAMPLE II

The same procedure was followed as above except that the bread was baked in a conventional hot air oven which is also capable of being utilized as a microwave oven or a combination of both which was other than a Hirst "Microaire" oven. Another change involved the use of 915 MHz instead of the 2450 MHz. Comparable results were obtained.

EXAMPLE III

The same procedure utilized in Example II was employed except that a combination of microwave frequencies was utilized by mixing 915 MHz and 2450 MHz. The output power of each of the frequencies may be divided evenly between the two frequencies. In other words, 25 watts output power at 915 MHz and 25 watts output power at 2450 MHz per loaf. Comparable results were obtained.

In summary, the work represented by the above examples and other work indicate that other microwave power levels, baking temperatures and baking times are feasible to produce a satisfactory product. The summary of the findings are as follows:

(1) Baking Temperature: 375° to 425° F., preferably 380°-420° F.

(2) Baking Time: with cover on—10 to 12 minutes; with cover off—10 to 12 minutes.

(3) Microwave Power: 25 to 100 watts per loaf, preferably 40 to 60 watts per loaf.

(4) Microwave Power Flux Density: 5 to 25 watt hours per pound loaf, preferably 8 to 12 watt hours per pound loaf.

While we have described above the principles of our invention in connection with a specific apparatus, it is to be clearly understood that this description is made only by way of example and not as a limitation to the scope of our invention as set forth in the objects thereof and in the accompanying claims.

We claim:

1. A method of producing a firm bread comprising the steps of:
   moulding a firm bread type dough into a plurality of one pound loaves;
   placing each of said plurality of loaves in a different one of a plurality of metal baking pans;
   proofing said plurality of loaves in said plurality of baking pans;
   placing a metal pan cover over each of said plurality of baking pans;
   partially baking said plurality of loaves in said plurality of covered baking pans in a hot air oven at a temperature of 375° to 425° F. for a first period of time of 10 to 12 minutes to achieve oven spring;
   removing said pan covers from said plurality of baking pans; and
   finish baking said plurality of loaves in said baking pans with said pan covers removed in a combined hot air and microwave oven operating simultaneously at an air temperature of 375° F. to 425° F. and with a microwave energy having a frequency equal to at least one of 915 MHz and 2450 MHz, a power of 25 to 100 watts per pound loaf and a power flux density of 5 to 25 watt hours per pound loaf for a second period of time of 10 to 12 minutes to complete the baking of said plurality of loaves and to evaporate a predetermined amount of moisture present in said plurality of loaves.

2. A method according to claim 1, wherein said microwave energy is simultaneously at a frequency of 915 MHz and 2450 MHz throughout said second period of time and said power is divided equal between the two frequencies.

3. A method according to claim 2, wherein said temperature in both said baking steps is 380° F. to 420° F.

4. A method according to claim 3, wherein
said power is 40 to 60 watts per pound loaf, and
said power density is 8 to 12 watt hours per pound loaf.

5. A method according to claim 2, wherein
said power is 40 to 60 watts per pound loaf, and
said power density is 8 to 12 watt hours per pound loaf.

6. A method according to claim 1, wherein said temperature in both said baking steps is 380° F. to 420° F.

7. A method according to claim 6, wherein
said power is 40 to 60 watts per pound loaf, and
said power density is 8 to 12 watt hours per pound loaf.

8. A method according to claim 1, wherein
said power is 40 to 60 watts per pound loaf, and
said power density is 8 to 12 watt hours per pound loaf.

* * * * *